July 20, 1954   J. O. ROESER   2,684,401

SEALTIGHT CONDUIT CONNECTOR

Filed Nov. 5, 1951

INVENTOR:
John O. Roeser
BY Clarence E. Threedy
HIS ATTORNEY.

Patented July 20, 1954

2,684,401

UNITED STATES PATENT OFFICE 2,684,401

SEALTIGHT CONDUIT CONNECTOR

John O. Roeser, Chicago, Ill., assignor to Electro-Snap Switch & Mfg. Co., a corporation of Illinois Application November 5, 1951, Serial No. 254,835

3 Claims. (Cl. 174—153)

My invention relates to a seal-tight conduit connector and has for its principal object the provision of an improved construction of this character which will be highly efficient in use and economical in manufacture.

Another object of the invention is to provide a connector of the character hereinafter described which comprises relatively few parts, resulting in economical assembly and cost of manufacture.

My improved connector is designed and intended to be used in connection with a hermetical electric switch housing such as disclosed in my pending application, Serial No. 243,697.

As such, it is an object of this invention to provide a connector which will effectively seal at the point of passage of conductor wires into a hermetically sealed switch enclosing housing against the admission into such housing of moisture or other elements, and one which will perform such function under the most severe temperatures.

Other objects will appear hereinafter.

The invention consists in the novel combination and arrangement of parts to be hereinafter described and claimed.

The invention will be best understood by reference to the accompanying drawings showing the preferred form of construction, and in which.

Figure 1:
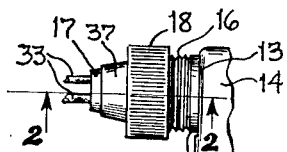
Fig. 1 is a fragmentary view showing my improved connector associated with a hermetically sealed housing.
Figure 2:
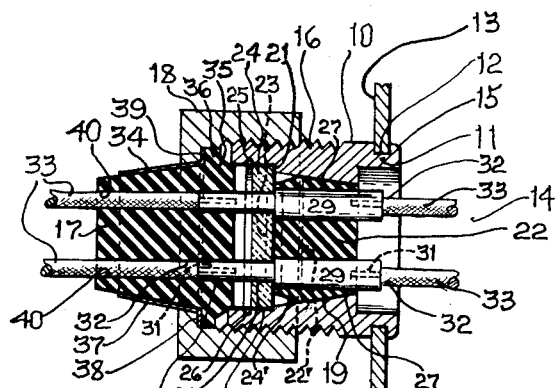
Fig. 2 is a sectional detail view taken substantially on line 2—2 of Fig. 1.
Figure 3:
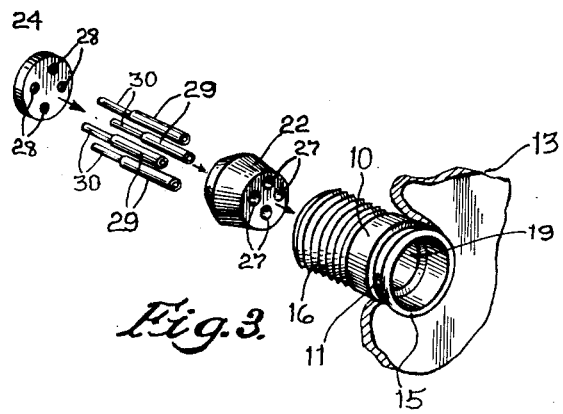
Fig. 3 is a perspective view of certain parts of the invention shown in exploded relation with respect to each other.
Figure 4:
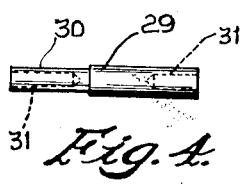
Fig. 4 is a side elevational view of a contemplated terminal pin to be employed in my invention.

The simplicity of my invention will be best understood from the following description illustrating the preferred form of construction. In this connection, my improved seal-tight conduit connector includes a nipple 10 having a reduced portion 11 snugly fitting into an opening 12 formed in a wall 13 of the hermetically sealed housing 14. The inner end portion of the reduced portion 11 of the nipple 10 is swaged to provide a flange 15 which fixedly secures the nipple to the wall 13 of the housing. This nipple is provided with a thread-bearing body portion 16 on which a retainer collar 18 is threaded. The nipple 10 provides a tapered bore 19 terminating at its inner end portion into a counterbore 20 providing at the junction between the counterbore 20 and the tapered bore 19, a shoulder 21.

Mounted in the tapered bore 19 is a plug 22 preferably formed of compressible material such as silicon rubber or the like. The plug 22 is tapered in opposite longitudinal directions from a predetermined point indicated by the dotted line 22'. One edge portion of this plug 22 is tapered to conform to the shape of the tapered bore 19 and is adapted to be compressed therein in a manner now to be described.

In its expanded condition the inner tapered end portion 24' of the plug 22 projects outwardly beyond the shoulder 21 as indicated by the dotted lines 23. Mounted in the counterbore 20 and pressed against the plug 22 to wedge the latter in the tapered bore 19, is a retainer disc 24 of relatively hard non-conductive material. This disc 24 is held compressed against the plug 22 by a retainer ring 25 mounted in an annular groove 26 formed in the cylindrical walls of the counterbore 20.

The plug 22 provides a plurality of longitudinally extending passages 27 which register with openings 28 formed in the disc 24. The openings 28 are of a diameter less than the diameter of the passages 27.

A plurality of terminal pins 29 are provided, each having reduced portion 30. The reduced portions 30 are adapted to fit snugly into the openings 28, while the remaining or enlarged portions of the terminals 29 are adapted to be snugly fitted into the openings 27. While I have shown the openings 28 of a diameter less than the diameter of the passages 27, it is manifest that this may be reversed and that the diameter of the passages 27 be made less than that of the openings 28, in which case the terminal pins may be constructed to accommodate the reverse construction. This may be done without departing from the spirit of the invention.

Each terminal pin in its opposite ends is provided with a counterbore 31 into which projects the end 32 of a conductor wire 33. It is preferable that the end 32 of such wire be soldered to the terminal pins 29.

Mounted in the collar 18 and projecting outwardly therefrom is an outer seal plug 17 formed of rubber or other compressible material and provided with a conical outer portion 34 and an inwardly projecting portion 35 likewise conically formed. At the junction of the inner and outer portions 34 and 35 is a flange 36. Snugly embracing the portion 34 is a metal cone or ring 37 having a flange 38 which is disposed between the flange 39 of the retainer collar 18 and the flange 36. This cone or ring serves to stiffen the outwardly projecting portion 34 and thereby acts as a shield or guard therefor. The seal plug 17 has openings 40 formed therein which register with the passages 27 to frictionally receive and seal the ends 30 of the terminal pins 29.

The inner end 35 of the plug 17 is adapted to be pressed into the adjacent end of the nipple 10 to effectively seal the same.

From the foregoing description, it will be apparent that I provide a seal-tight conduit connector for the conductor wires 33, which is relatively simple in construction and highly efficient in preventing the admission of moisture or other elements into the housing 14. In such housing 14 is confined, as shown in my afore-mentioned application, a switch unit. It is highly desirable that this switch unit be protected from moisture and the like. By the employment of a conduit connector as described herein, no moisture or other elements can find admission into the housing 14 within which is hermetically sealed the switch unit in question.

My improved conduit connector is designed of such material and in such a manner as to withstand the most severe temperatures which have the effect of creating condensation.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A seal-tight conduit connector including a union comprising a nipple and a conduit having threaded connection therewith, said nipple having a longitudinally extending tapered bore formed therein, the inner end of which terminates into a counterbore providing a shoulder at the junction of the counterbore and the tapered bore, a compressible plug having one end position thereof tapered longitudinally to conform to the bore and wedged in said bore, the inner end portion of said plug being tapered in an opposite longitudinal direction with respect to said bore, said plug having longitudinally extending passages formed therein, the inner end of said plug extending into the counterbore beyond said shoulder, a non-conductive disc of relatively hard material mounted in said counterbore and compressed against the said inner end of said plug, the inner cylindrical walls of said counterbore having an annular groove formed therein, a ring member mounted in said groove and compressing the disc against the inner end of said plug until said disc sits on said shoulder, said disc having openings therein in alignment with the passages formed in said plug, and a plurality of terminal pins snugly fitting into the passages of said plug, the diameter of the openings of said disc being less than the diameter of the passages, and said terminal pins having extended portions of a diameter to fit snugly into the openings of said disc.

2. A seal-tight conduit connector including a nipple having threaded connection therewith, said nipple having a longitudinally extending tapered bore formed therein, the inner end of which terminates into a counterbore providing a shoulder at the junction of the counterbore and the tapered bore, a compressible plug having one end portion thereof tapered longitudinally to conform to the bore and wedged in said bore, the inner end portion of said plug being tapered in an opposite longitudinal direction with respect to said bore, said plug having longitudinally extending passages formed therein, the inner end of said plug extending into the counterbore beyond said shoulder, a non-conductive disc of relatively hard material mounted in said counterbore and compressed against the said inner end of said plug until said disc sits on said shoulder, the inner cylindrical walls of said counterbore having an annular groove formed therein, a ring member mounted in said groove and compressing the disc against the inner end of said plug until said disc sits on said shoulder, said disc having openings therein in alignment with the passages formed in said plug, and terminal pins snugly fitted in said openings of said disc and said passages of said plug.

3. A seal-tight conduit connector including a nipple having threaded connection therewith, said nipple having a longitudinally extending tapered bore formed therein, the inner end of which terminates into a counterbore providing a shoulder at the junction of the counterbore and the tapered bore, a compressible plug having one end portion thereof tapered longitudinally to conform to the bore and wedged in said bore, the inner end portion of said plug being tapered in an opposite longitudinal direction with respect to said bore, said plug having longitudinally extending passages formed therein, the inner end of said plug extending into the counterbore beyond said shoulder, a non-conductive disc of relatively hard material mounted in said counterbore and compressed against the said inner end of said plug until said disc sits on said shoulder, the inner cylindrical walls of said counterbore having an annular groove formed therein, a ring member mounted in said groove and compressing the disc against the inner end of said plug until said disc sits on said shoulder, said disc having openings therein in alignment with the passages formed in said plug, terminal pins snugly fitted in said openings of said disc and said passages of said plug and extending beyond the disc, and a sealing structure for said outer end of the nipple and into which said extending end portions of said pins are projected.

References Cited in the file of this patent

UNITED STATES PATENTS

| Number | Name | Date |
|---|---|---|
| 2,275,762 | Horton | Mar. 10, 1942 |
| 2,443,654 | Else et al. | June 22, 1948 |
| 2,563,713 | Frei et al. | Aug. 7, 1951 |